J. C. REYNOLDS.
SAFETY GAS REGULATOR.
APPLICATION FILED JAN. 18, 1910.
1,115,244.
Patented Oct. 27, 1914.
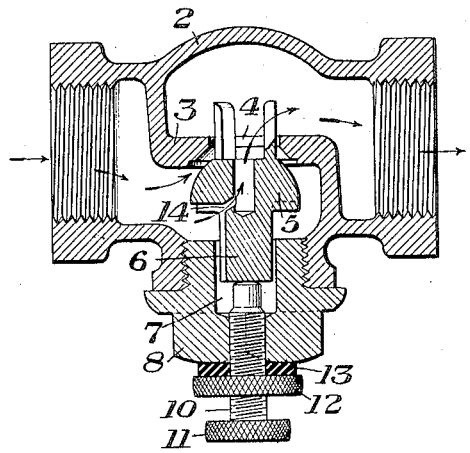
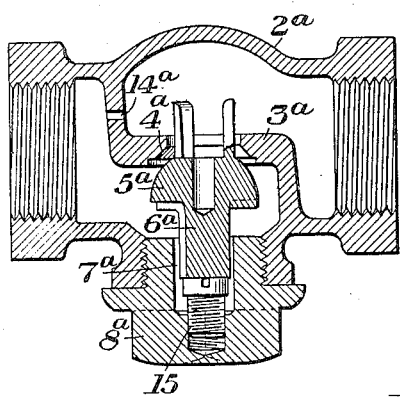
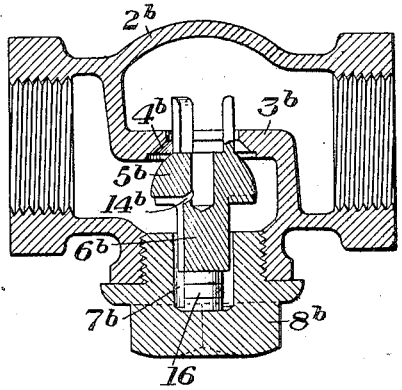
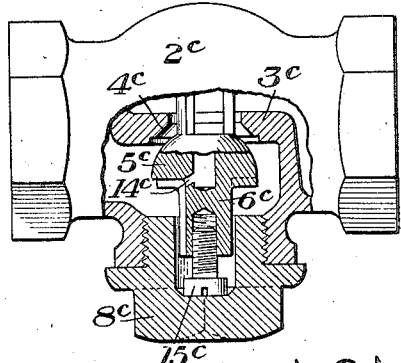
WITNESSES
INVENTOR
Jno. C. Reynolds,
his Attys.

UNITED STATES PATENT OFFICE.

JOHN C. REYNOLDS, OF RIXFORD, PENNSYLVANIA.

SAFETY GAS-REGULATOR.

1,115,244.

Specification of Letters Patent.

Patented Oct. 27, 1914.

Application filed January 18, 1910. Serial No. 538,741.

*To all whom it may concern:*

Be it known that I, JOHN C. REYNOLDS, a citizen of the United States, and resident of Rixford, McKean county, State of Pennsylvania, have invented a new and useful Improvement in Safety Gas-Regulators, of which the following is a full, clear, and exact description, reference being had to the accompanying drawings, forming part of this specification, in which—

Figure 1 is a sectional view through one form of my improved regulator; Figs. 2 and 3 are similar views showing a modified form of adjustment for the valve; and Fig. 4 is a sectional view through a portion of the casing showing another form of adjustment for the valve.

My invention relates to regulators for controlling the flow of gas to a burner and is designed to provide a simple, cheap and efficient device of this character, which will prevent the pressure exceeding a certain predetermined limit without entirely shutting off the flow of gas when the pressure exceeds this limit. Also in providing means for adjusting the height of the valve with relation to its seat, so as to feed a predetermined amount of gas to the burner.

The precise nature of my invention will be best understood by reference to the accompanying drawings, which will now be described, it being premised, however, that various changes may be made in the details of construction and general arrangement of parts, without departing from the spirit and scope of my invention as defined in the appended claim.

In Fig. 1 of the drawings, the numeral 2 designates the casing of a gas pipe connection or fitting, containing a separating bridge or partition 3. This bridge is provided with an orifice 4, around which is formed a seat for an upwardly moving conical valve 5. This valve 5 is provided with a downwardly extending stem 6, which is arranged to slide or move in an orifice 7 in a cap 8. The cap 8 is provided with a screw threaded portion which engages the screw threads in an opening in the bottom of the valve, and it is also provided with a flange to engage a seat on the casing to seal the opening. Extending upwardly through the cap 8 is an adjusting screw 10, which is provided with screw threads engaging a threaded orifice in the central portion of the cap. This screw 10 is provided with a knurled head 11, and 12 is a jam nut on the screw 10.

13 is a packing ring or washer which surrounds the screw 10 and is interposed between the jamming nut 12 and the face of the cap 8, and is provided to seal the opening through which the screw 10 passes.

14 is a by-path which extends through the valve 5, and is provided to allow the gas to flow from the inlet side of the chamber to the outlet side when the valve is closed.

The operation of the device is as follows: The regulator being placed in the pipe leading from the supply to the burner, the gas will pass through it in the direction indicated by the arrows in Fig. 1. The weight of the valve should be equal to the desired pressure for the outlet side of the casing. The screw 10 is adjusted to raise or lower the valve to give the required opening between the valve and the orifice in the bridge or partition, to feed the proper amount of gas for the burner, and the jam nut 12 is then screwed against the packing ring 13 to seal the opening and to lock the screw 10 in its adjusted position. As the gas flows through this regulator, it presses on the bottom of the valve and tends to close it, this pressure being opposed by the weight of the valve. Whenever the pressure exceeds the weight of the valve, it will force the valve to its seat and the supply will be cut off except for the small amount passing through the by-path 14 in the valve, which will supply sufficient gas to keep the burner lighted. As soon as the pressure is lowered to a point where the weight of the valve is slightly greater than the pressure, the valve will drop and allow the gas to pass through the orifice 4, as before described.

It is sometimes desirable to place the valve adjusting device in the interior of the casing so as to prevent tampering with the set of the valve. This is advantageous in public places to prevent unauthorized persons from varying the supply to the burner. In Figs. 2, 3 and 4, I have shown several modified forms in which I have shown practical means for accomplishing this purpose.

In Fig. 2 I have designated all of the similar parts by the same reference numerals with the letter *a* affixed. In this construction 15 designates a set screw which is placed in an orifice in the inside of the cap 8ª, and by regulating this screw the height of the valve can be adjusted, after which the cap is inserted in place to seal the bottom portion of the valve. In this construction I have shown a by-path 14ª which extends through the partition or bridge 3.

In Fig. 3. I have placed a series of washers or liners 16 in the bottom of the cap 8 to regulate the height of the valve. One or more of these liners may be removed to lower the valve and increase the size of the opening, or an additional liner may be inserted to diminish the size of the opening. In this figure I have designated all of the similar parts by the same reference numeral with the letter b affixed.

In Fig. 4 I have shown the cap 8ᶜ and a small portion of the casing 2ᶜ. The valve stem 6ᶜ of the valve 5ᶜ is provided with an adjusting screw 15ᶜ similar to the adjusting screw 15 in Fig. 2, for adjusting the height of the valve.

Heretofore in devices of this character the valve was opened and held from the seat by means of a spring. I have discovered that springs are not to be relied upon for any length of time, and also that it is very difficult to manufacture a plurality of springs of equal power.

The advantages of my invention will be apparent to those skilled in the art, since the danger arising from excessive pressure at the burner is done away with by means of a valve which is closed when the pressure arises above a predetermined point, and which is again opened when the pressure is reduced below the weight of the valve. By this arrangement, I am also enabled to make a plurality of valves all of which will be operated by the same pressure, or I can make a valve that will be operated by a predetermined pressure. Further in the provision of means for regulating the size of the opening, and which means may also be incased within the valve casing to avoid any tampering therewith.

I claim:

An automatic gas valve having a casing, said casing having a horizontally disposed inlet at one end and a horizontally disposed outlet at the other end, a partition having a horizontal portion between the inlet and outlet, there being a vertical opening through said partition, a valve seat on the under side thereof, there being a threaded opening through the bottom wall of the casing in line with the opening through the partition, a screw plug seated therein, there being a recess in the screw plug, a check valve having a downwardly extending member seated in the recess in the screw plug and guided therein, said check valve being arranged to be moved upwardly to engage the seat surrounding the opening through the partition when an excess pressure of gas passes through the valve, an adjusting screw for limiting the downward movement of the valve extending through the screw plug, and means for securing said screw plug in its adjusted position, substantially as described.

In testimony whereof, I have hereunto set my hand.

JOHN C. REYNOLDS.

Witnesses:
JESSE B. HELLER,
H. M. CORWIN.